United States Patent
Bandyopadhyay et al.

(10) Patent No.: US 9,732,713 B2
(45) Date of Patent: Aug. 15, 2017

(54) PURGE SYSTEM FOR A DUAL-FUEL ENGINE

(71) Applicant: ELECTRO-MOTIVE DIESEL, INC., LaGrange, IL (US)

(72) Inventors: Deep Bandyopadhyay, Naperville, IL (US); Farhan F. Devani, Morton Grove, IL (US); John P. Timmons, Chillicothe, IL (US); David T. Montgomery, Edelstein, IL (US); Aaron G. Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 94 days.

(21) Appl. No.: 14/684,327

(22) Filed: Apr. 10, 2015

(65) Prior Publication Data

US 2016/0298554 A1   Oct. 13, 2016

(51) Int. Cl.
| | |
|---|---|
| *F02M 37/00* | (2006.01) |
| *F02M 25/08* | (2006.01) |
| *F02D 19/06* | (2006.01) |
| *F02D 41/30* | (2006.01) |
| *F02D 41/00* | (2006.01) |

(Continued)

(52) U.S. Cl.
CPC ..... *F02M 37/0052* (2013.01); *F02D 19/0621* (2013.01); *F02D 41/0025* (2013.01); *F02D 41/0027* (2013.01); *F02D 41/3047* (2013.01); *F02M 25/089* (2013.01); *F02M 25/0836* (2013.01); *F02M 25/0854* (2013.01); *F02B 25/04* (2013.01); *F02D 19/0689* (2013.01); *F02D 19/0692* (2013.01);

(Continued)

(58) Field of Classification Search
CPC ........ F02D 19/02; F02D 19/10; F02D 41/004; F02M 25/089; F02M 25/0836; F02M 25/0854; F02M 37/0052; F02M 21/0218; F02M 21/023; F02M 21/0233; F02M 21/0239
See application file for complete search history.

(56) References Cited

U.S. PATENT DOCUMENTS 2,179,709 A * 11/1939 Brecht .................... F02B 69/00
                                                                123/193.1
2,560,700 A *  7/1951 Pervier .................... F02F 1/22
                                                                123/41.72
(Continued)

FOREIGN PATENT DOCUMENTS

DE    102011003909 A1    8/2012
WO       02101230 A1    12/2002

*Primary Examiner* — Hieu T Vo
*Assistant Examiner* — Sherman Manley
(74) *Attorney, Agent, or Firm* — Finnegan, Henderson, Farabow, Garrett & Dunner, LLP

(57) ABSTRACT

A fuel system for an engine has a cylinder with an inlet air port, an air box surrounding the inlet air port, and a gaseous fuel injector positioned in the air box and having a nozzle located at the inlet air port. The fuel system also has a gaseous fuel control valve, a fuel supply line fluidly extending from the gaseous fuel control valve to the gaseous fuel injector, a purge valve, and a purge fluid supply line fluidly extending from the purge valve to at least one of the fuel supply line and the gaseous fuel injector. The fuel system also has a return valve and a return line fluidly extending from at least one of the fuel supply line and the gaseous fuel injector.

20 Claims, 2 Drawing Sheets

(51) Int. Cl.
*F02B 25/04* (2006.01)
*F02M 21/02* (2006.01)
*F02D 19/10* (2006.01)

(52) U.S. Cl.
CPC .......... *F02D 19/10* (2013.01); *F02D 2400/04* (2013.01); *F02M 21/0281* (2013.01)

(56) References Cited

U.S. PATENT DOCUMENTS

| | | | | |
|---|---|---|---|---|
| 2,686,503 | A * | 8/1954 | Reddy | F02B 7/06 123/27 GE |
| 3,407,790 | A * | 10/1968 | Antonsen | F01B 7/14 123/27 GE |
| 3,572,297 | A | 3/1971 | Murray | |
| 4,465,050 | A * | 8/1984 | Igashira | F02D 41/0002 123/472 |
| 4,977,875 | A | 12/1990 | Kumagai et al. | |
| 5,596,969 | A | 1/1997 | Lipinski | |
| 5,623,907 | A * | 4/1997 | Cotton | F02M 37/10 123/179.17 |
| 5,632,253 | A * | 5/1997 | Paul | F02M 21/0263 123/531 |
| 5,755,210 | A * | 5/1998 | Sato | F02B 43/00 123/518 |
| 7,284,543 | B2 * | 10/2007 | Kato | F02M 21/0254 123/527 |
| 7,506,638 | B2 * | 3/2009 | Shinkarenko | F02M 31/20 123/27 GE |
| 8,037,849 | B1 * | 10/2011 | Staroselsky | F02M 21/08 123/1 A |
| 8,166,956 | B2 * | 5/2012 | Ulrey | F02D 19/0694 123/525 |
| 8,191,530 | B2 | 6/2012 | Gruber et al. | |
| 8,899,500 | B2 | 12/2014 | Kuzuma et al. | |
| 9,027,534 | B2 * | 5/2015 | Kim | F02D 19/0605 123/299 |
| 2009/0084366 | A1 * | 4/2009 | Gachik | F02B 21/00 123/585 |
| 2013/0098333 | A1 * | 4/2013 | Kim | F02M 43/04 123/445 |
| 2013/0133624 | A1 | 5/2013 | Hirose et al. | |
| 2014/0076283 | A1 * | 3/2014 | Pursifull | F02M 21/0239 123/458 |
| 2014/0081565 | A1 * | 3/2014 | Pursifull | F02D 19/022 701/113 |
| 2014/0116375 | A1 | 5/2014 | Kim et al. | |
| 2014/0116388 | A1 * | 5/2014 | Foege | F02B 25/04 123/456 |
| 2014/0238350 | A1 | 8/2014 | Fiveland et al. | |
| 2014/0305406 | A1 * | 10/2014 | Pursifull | F02M 21/0239 123/434 |
| 2014/0338633 | A1 | 11/2014 | Fern | |

\* cited by examiner

PURGE SYSTEM FOR A DUAL-FUEL ENGINE

TECHNICAL FIELD

The present disclosure is directed to a purge system and, more particularly, to a purge system for a dual-fuel engine.

BACKGROUND

Due to the rising cost of liquid fuel (e.g. diesel fuel) and ever increasing restrictions on exhaust emissions, engine manufacturers have developed dual-fuel engines. An exemplary dual-fuel engine provides injections of a low-cost gaseous fuel (e.g. natural gas) through air intake ports of the engine's cylinders. The gaseous fuel is introduced with clean air that enters through the intake ports and is ignited by liquid fuel that is injected during each combustion cycle. Because a lower-cost gaseous fuel is used together with liquid fuel, cost efficiency may be improved. In addition, the combustion of the gaseous and liquid fuel mixture may result in a reduction of harmful emissions.

In dual-fuel engines, use of a gaseous fuel injector may necessitate inclusion of a gaseous fuel control valve to control the flow of gaseous fuel through a pathway into the combustion chamber. However, operation of the control valve may result in residual gaseous fuel at one or more locations along the gaseous fuel pathway after the control valve closes. This residual gaseous fuel may become undesirable waste or contaminate a subsequent injection event.

One method of handling the difficulties presented by residual gaseous fuel is described in U.S. Pat. No. 5,632,253 (the '253 patent) that issued to Paul et al, on May 27, 1997. The '253 patent describes a combustion system, in which fuel is injected into a combustion chamber through a fuel injection line. Once the fuel flow is cut off, air is injected into the fuel injection line to purge the line of any residual fuel until the combustion chamber is ready for another injection.

Although the system of the '253 patent may address the drawbacks associated with residual fuel located in fuel injection lines, it may not be adequate for all applications. For example, in systems that include a gaseous fuel injector located in an air box, the system may force the residual fuel into the air box, thus contaminating the air supply. Further, the residual fuel that is purged from the fuel injection lines may still become waste, thus reducing the efficiency of the system.

The disclosed purge system is directed to addressing one or more of the problems set forth above and/or other problems of the prior art.

SUMMARY

In one aspect, the present disclosure is directed to a fuel system for an engine having a cylinder with an inlet air port. The fuel system includes an air box surrounding the inlet air port, a gaseous fuel injector positioned in the air box and having a nozzle located at the inlet air port, a gaseous fuel control valve, and a fuel supply line fluidly extending from the gaseous fuel control valve to the gaseous fuel injector. The fuel system also includes a purge valve, a purge fluid supply line fluidly extending from the purge valve to at least one of the fuel supply line and the gaseous fuel injector, a return valve, and a return line fluidly extending from at least one of the fuel supply line and the gaseous fuel injector.

In another aspect, the present disclosure is directed to a method of directing gaseous fuel into an engine having a cylinder with an inlet air port. The method includes directing gaseous fuel to flow through a gaseous fuel control valve into a fuel supply line and controlling a gaseous fuel injector to inject the gaseous fuel from the fuel supply line through the inlet air port into the cylinder. The method also includes directing a purge fluid through a purge valve and a purge fluid supply line to displace residual gaseous fuel in at least one of the supply line and the gaseous fuel injector at conclusion of an injection event. The method further includes applying a negative pressure to at least one of the fuel supply line and the gaseous fuel injector to draw the residual gaseous fuel through a return line and a return valve.

In another aspect, the present disclosure is directed to a fuel system having an engine block defining a plurality of cylinders, an air box connected to a side of the engine block, and a cylinder liner disposed in each of the plurality of cylinders and having a plurality of radially located air intake ports. The fuel system also includes a gaseous fuel injector positioned in the air box and having a nozzle located at a first air intake port of the plurality of air intake ports and configured to inject gaseous fuel radially through the first air intake port, a gaseous fluid control valve fluidly coupled to the gaseous fuel injector, and a supply line fluidly extending from the gaseous fluid control valve to the gaseous fluid injector. The fuel system further includes a purge valve, a purge fluid supply line fluidly extending from the purge valve to the supply line, the gaseous fluid injector, or both, a return valve, and a return line fluidly extending from the supply line, the gaseous fluid injector, or both to the return valve.

DETAILED DESCRIPTION

Figure 1:
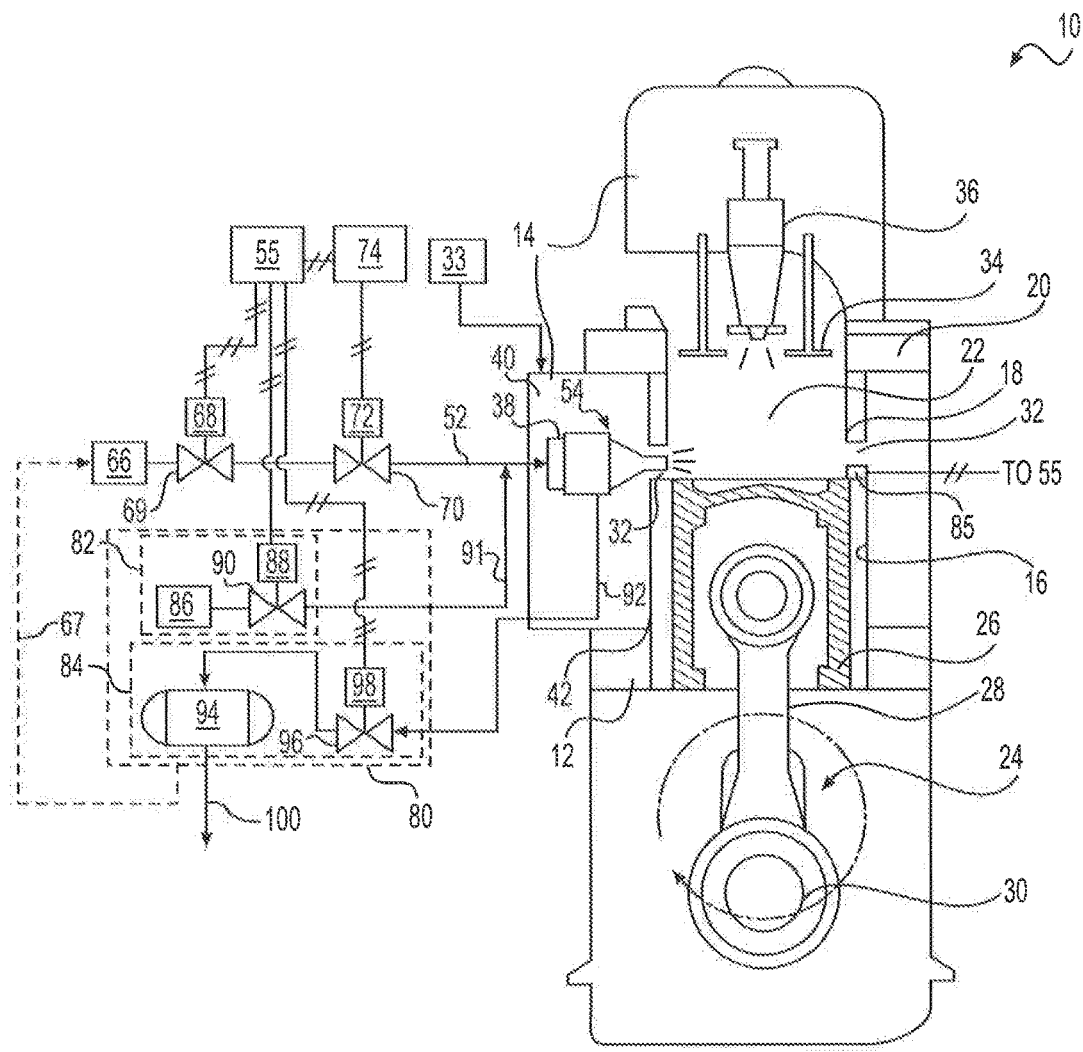
FIG. 1 is a schematic and cross-sectional illustration of a dual-fuel engine equipped with an exemplary purge system.

FIG. 1 illustrates an exemplary internal combustion engine 10. The engine 10 is depicted and described as a two-stroke dual-fuel engine. The engine 10 may include an engine block 12 that at least partially defines a plurality of cylinders 16 (only one shown), each having an associated cylinder head 20. A cylinder liner 18 may be disposed within each engine cylinder 16, and the cylinder head 20 may close off an upper end of the cylinder liner 18. A piston 24 may be slidably disposed within each cylinder liner 18. Each cylinder liner 18, the cylinder head 20, and the piston 24 may together define a combustion chamber 22 that receives fuel from a fuel system 14 mounted to the engine 10. It is contemplated that the engine 10 may include any number of engine cylinders 16 with corresponding combustion chambers 22.

Within the cylinder liner 18, the piston 24 may be configured to reciprocate between a bottom-dead-center (BDC) or lower-most position, and a top-dead-center (TDC) or upper-most position. In particular, the piston 24 may be an assembly that includes a piston crown 26 pivotally connected to a rod 28, which may in turn be pivotally connected to a crankshaft 30. The crankshaft 30 of the engine 10 may be rotatably disposed within the engine block 12 and each piston 24 coupled to the crankshaft 30 by the rod 28 so that a sliding motion of each piston 24 within the liner 18 results in a rotation of the crankshaft 30. Similarly, a rotation of the crankshaft 30 may result in a sliding motion of the piston 24. As the crankshaft 30 rotates through about 180 degrees, the piston crown 26 and the connected rod 28 may move through one full stroke between BDC and TDC. The engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into the combustion chamber 22 via one or more gas exchange ports (e.g., air intake ports) 32 located within a sidewall of the cylinder liner 18. In particular, as the piston 24 moves downward within the liner 18, a position will eventually be reached at which the air intake ports 32 are no longer blocked by the piston 24 and instead are fluidly coupled to the combustion chamber 22. When the air intake ports 32 are in fluid communication with the combustion chamber 22 and a pressure of air at the air intake ports 32 is greater than a pressure within the combustion chamber 22, air will pass through the air intake ports 32 into the combustion chamber 22. Gaseous fuel (e.g., methane or natural gas) may be introduced into the combustion chamber 22 (e.g., radially injected) through at least one of the air intake ports 32. The gaseous fuel may mix with the air to form a fuel/air mixture within the combustion chamber 22.

At some point, the piston 24 will start an upward movement that blocks the air intake ports 32 and compresses the air/fuel mixture. As the air/fuel mixture within the combustion chamber 22 is compressed, a temperature of the mixture may increase. At a point when the piston 24 is near TDC, a liquid fuel (e.g., a diesel or other petroleum-based liquid fuel) may be injected into the combustion chamber 22 via a liquid fuel injector 36. The liquid fuel may be ignited by the hot air/fuel mixture, causing combustion of both types of fuel and resulting in a release of chemical energy in the form of temperature and pressure spikes within the combustion chamber 22. During a first phase of the power/exhaust/intake stroke, the pressure spike within the combustion chamber 22 may force the piston 24 downward, thereby imparting mechanical power to the crankshaft 30. At a particular point during this downward travel, one or more gas exchange ports 34 (e.g., exhaust ports) located within the cylinder head 20 may open to allow pressurized exhaust within the combustion chamber 22 to exit, and the cycle will restart.

The liquid fuel injector 36 may be positioned inside the cylinder head 20 and configured to inject liquid fuel into a top of the combustion chamber 22 by releasing fuel axially toward an interior of the cylinder liner 18 in a generally cone-shaped pattern. The liquid fuel injector 36 may be configured to cyclically inject a fixed amount of liquid fuel depending on a current engine speed and/or load. In one embodiment, the engine 10 may be arranged to run on liquid fuel injections alone, gaseous fuel alone, or a mixture of liquid and gaseous fuel.

The air intake ports 32 may be fluidly coupled to an air supply 33. The air supply 33 may be configured to continuously supply air to an air box 40 that surrounds and communicates with each of the ports 32. In one embodiment, the air box 40 is fluidly coupled to the outlet of an air compressor, which may be part of the air supply 33 and/or part of an exhaust-driven turbocharger or supercharger. In some such embodiments, the outlet pressure of the air compressor varies from about 14.5 psig (100 kPa gauge) to about 43.5 psig (300 kPa gauge).

The gaseous fuel may be injected through the air intake port 32 into the combustion chamber 22 via any number of gaseous fuel injectors 38. The gaseous fuel injectors 38 may be mounted directly to a wall 42 of the engine block 12 or to the cylinder liner 18 inside of the air box 40, such that a nozzle 54 of the gaseous fuel injector 38 is in fluid communication with one of the air intake ports 32 of an adjacent engine cylinder 16. The gaseous fuel may be injected radially into the combustion chamber 22 through the corresponding air intake port 32 after the air intake port 32 is opened by movement of the piston 24. The amount of gaseous fuel injected into the combustion chamber 22 may vary based on the engine load and/or speed and may be controlled by an electronic controller 55, which may be powered by a power source 74.

As depicted in FIG. 1, the fuel system 14 may include an individual fuel line 52 for each gaseous fuel injector 38, a pressurized gaseous fuel storage tank 66, and a regulator 68 coupled to a valve 69. The pressurized gaseous fuel storage tank 66 may represent any fuel tank or other container configured to serve as a fuel reservoir. The regulator 68 may be controlled by the electronic controller 55. However, in other embodiments, the regulator 68 may be a regulator with a manual pressure set point that is not controlled by the electronic controller 55. The gaseous fuel pressure leaving the regulator 68 may be maintained between about 7.3 psid (about 50 kPa) to about 73 psid (about 500 kPa) above a discharge pressure of the compressor in the air supply 33.

A gaseous fluid control valve 70 may be coupled to a valve actuator 72 and disposed in the fuel line 52. The gaseous fluid control valve 70 may be a pintle valve, a poppet valve, or any other suitable valve, such as valves having a time response below at or below a predetermined threshold for the given implementation. The valve actuator 72 may be driven under the control of the electronic controller 55 to move the valve 70 to any position between a fully open position and a fully closed position. This movement may be powered by the power source 74 in some embodiments. In one embodiment, the valve actuator 72 is a solenoid or a servomotor. In another embodiment, the valve actuator 72 is a pneumatic or hydraulic piston.

The fuel system 14 may also include a purge system 80 configured to purge residual gaseous fuel from the fuel line 52 and/or the gaseous fuel nozzle 38 after closure of the gaseous fluid control valve 70 and/or blocking of the air intake port 32. To that end, in the illustrated embodiment, the purge system 80 may include a positive pressure subsystem 82 configured to apply a positive pressure to the residual gaseous fuel and a negative pressure subsystem 84 configured to apply a negative pressure to the residual gaseous fuel. However, in other embodiments, the purge system 80 may include only the positive pressure subsystem 82 or only the negative pressure subsystem 84.

The positive pressure subsystem 82 may include a purge fluid supply 86 coupled to an admittance valve 90 under control of a regulator 88. The admittance valve 90 may be fluidly coupled to the fuel line 52, the gaseous fuel injector 38, or both via a purge line 91. The admittance valve 90 may be configured to open, close, and partially open to admit (or inhibit) a purge fluid (e.g., air) from the fluid supply 86 through the purge line 91 into the fuel line 52 and/or the gaseous fuel injector 38.

In some embodiments, the regulator 88 may be controlled by the electronic controller 55. However, in other embodiments, the regulator 88 may be a regulator with a manual pressure set point that is not controlled by the electronic controller 55. In embodiments in which the regulator 88 is controlled by the electronic controller 55, the electronic controller 55 may direct the regulator 88 to actuate the admittance valve 90 to adjust a downstream parameter (e.g., pressure, flow rate, injection timing, etc.) of the purge fluid.

Further, the electronic controller 55 may be configured to coordinate actuation of the admittance valve 90 by the regulator 88 with actuation of the gaseous fluid control valve 70 by the valve actuator 72, thereby coordinating the injection of the gaseous fuel with the injection of the purge fluid. For example, in one embodiment, the electronic controller 55 may direct the valve actuator 72 to close the gaseous fluid control valve 70 approximately concurrently with a direction to the regulator 88 to open the admittance valve 90 such that the residual gaseous fluid in the fuel line 52 and/or in the gaseous fuel injector 38 is forced either into the combustion chamber 22 before the air port 32 is closed or into a return line 92. As such, in some embodiments, the positive pressure subsystem 82 may increase the efficiency of the combustion engine 10 by forcing the residual gaseous fuel into the combustion chamber 22, or the efficiency of the fuel system by forcing the residual gaseous fuel into the return line 92 for reuse.

In the illustrated embodiment, the negative pressure subsystem 84 includes an accumulator 94 for collecting the residual gaseous fuel received from the fuel line 52 and/or the gaseous fuel injector 38 via the return line 92. The flow of the residual gaseous fuel into and through the return line 92 is controlled via a return valve 96 controlled by a regulator 98. The regulator 98 and the return valve 96 may be configured to adjust a pressure differential between the return line 92 and the fuel line 52 and/or the gaseous fuel injector 38 to selectively draw the residual gaseous fuel from the fuel line 52 and/or the gaseous fuel injector 38 into the accumulator 94. To that end, the regulator 98 may be under control of electronic controller 55 or may be a regulator with a manual pressure set point that is not controlled by the electronic controller 55.

The residual gaseous fuel accumulated in the accumulator 94 may then be directed to a downstream location indicated by an arrow 100 in some embodiments. In other embodiments, the accumulated residual gaseous fuel may be recycled back into the fuel supply system 14. For example, the accumulated residual gaseous fuel may be directed via a supply line 67 to fuel storage tank 66 for use in a subsequent injection into the combustion chamber 22.

The purge system 80 may coordinate control of the positive pressure subsystem 82 and/or the negative pressure subsystem 84 at least in part based on feedback from one or more sensors 85, which may be located in the air box 40 or at any other desired location within the system. In some embodiments, the sensor 85 may represent a performance sensor positioned at one or more air intake ports 32 for gauging the flow of air and/or gaseous fuel through the respective air intake ports 32. For example, the sensor 85 may be placed at an air intake port 32 adjacent the air intake port 32 housing nozzle 54 of gaseous fuel injector 38. In this implementation, the sensor 85 may be a pressure sensor configured to gauge the pressure of air coming into the cylinder 16 from the air box 40. In another embodiment, the sensor 85 may be positioned at an air intake port 32 on a side of the cylinder 16 opposite from the gaseous fuel injector 38. In that case, the sensor 85 may be a fuel sensor configured to detect fuel from the gaseous fuel injector 38 that has exited the cylinder 16 through the respective air intake port 32. In these or other embodiments, the sensor 85 may provide feedback to the controller 55, which may then relay instructions to the regulator 68, the actuator 72, the regulator 88, and/or the regulator 98 to responsively adjust the pressure, flow rate, and/or flow direction of the gaseous fuel, the residual gaseous fuel, and/or the purge fluid.

Figure 2:
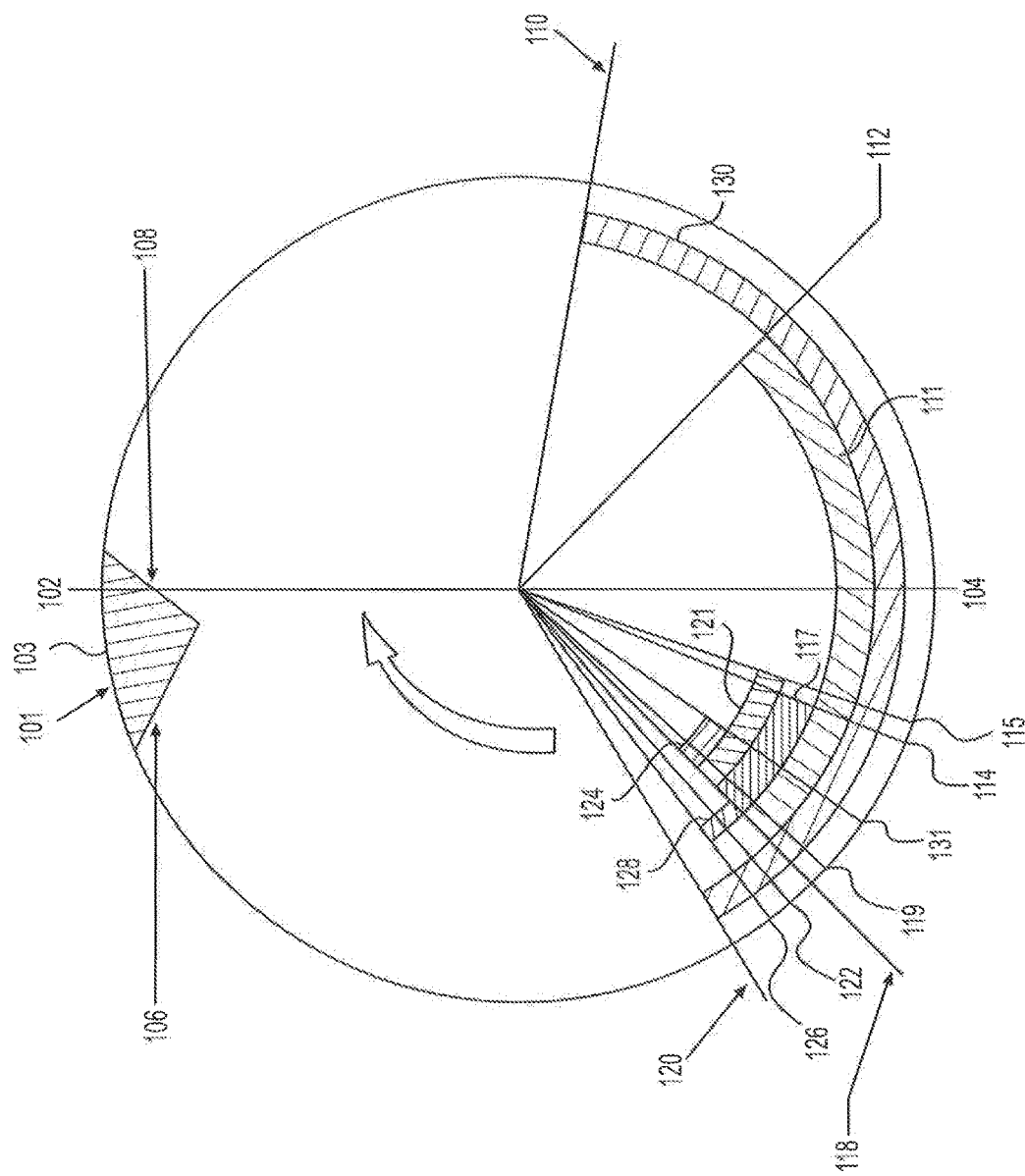
FIG. 2 is an exemplary disclosed timing diagram associated with operation of the dual-fuel engine of FIG. 1.

FIG. 2 illustrates an exemplary timing diagram 101 depicting operations of the engine 10. FIG. 2 will be discussed in detail in the following section to further illustrate the disclosed concepts.

INDUSTRIAL APPLICABILITY

The disclosed purge system 80 may be applicable to any gaseous fuel or dual-fuel engine. The purge system 80 may be used in a new engine or retrofitted into an existing engine. During operation, the purge system 80 may function to force residual gaseous fuel into the combustion chamber 22 using the positive pressure subsystem 82 when the air intake ports 32 are open. The purge system 80 may also or alternatively function to suck the residual gaseous fuel into the accumulator 94 when the air intake ports 32 are closed to reduce or prevent the likelihood that the residual gaseous fuel will leak into the air box 40. By coordinating operation of the positive pressure subsystem 82 and the negative pressure subsystem 84 in this manner, the residual gaseous fuel may be injected into the combustion chamber 22 when the air intake ports 32 are open and recovered when the air intake ports 32 are closed, thereby increasing operational efficiency of the engine 10. Operation of the engine 10 will now be explained with reference to FIG. 2.

At startup, the engine 10 may run conventionally on only liquid fuel injections near TDC 102, although it is possible for initial combustion cycles to include both liquid and gaseous fuels. The liquid fuel injection period is represented by a region 103 extending between a liquid start of injection (SOI) point 106 when the liquid injection begins and a liquid end of injection (EOI) point 108 when the liquid injection ends. In the disclosed example, the SOI occurs at about 10-20° of crank angle rotation before TDC (BTDC), and the EOI occurs at about 0-10° of crank angle rotation after TDC (ATDC).

After startup, and as piston 24 moves towards BDC 104 during its power/exhaust/intake stroke, exhaust ports 34 may be opened near a point 110, which may be about 97° (e.g., 97°±5°) of crank angle rotation ATDC. Piston 24 may continue downwardly until piston crown 26 begins to uncover air intake ports 32 at a corresponding point 112, which may be about 32° (e.g., 32°±5°) of crank angle rotation after the exhaust ports 34 open near the point 110, and at which point air begins to enter the combustion chamber 22 through the air intake ports 32. Once piston crown 26 passes the bottom of air intake ports 32, the ports 32 may be fully open, and air may enter the cylinder 16 from the air box 40 until the ports 32 close at a point 118, which is about 102° (e.g., 102°±5°) of crank angle rotation after the air intake ports 32 open at the point 112, and about 231° (e.g., 231°±5°) of crank angle rotation after TDC. Accordingly, a region 111 corresponds to the period of time during which the air intake ports 32 are partially or fully open and may extend about 102° (e.g., 102°±5°) of crank angle rotation.

Gaseous fuel may be injected from gaseous fuel injector 38 while the air intake ports 32 are open. For example, gaseous fuel may be injected during a time period between corresponding points 114 and 118 represented by a gaseous fuel injection region 117. The SOI of the gaseous fuel at the point 114 may begin at about 150° (e.g., 150°±5°) of crank angle rotation before TDC. Accordingly, the gaseous fluid control valve 70 may open at a point 115 immediately preceding the gaseous fuel injection by about 1-3° of crank angle rotation to provide time for the gaseous fuel to flow through passage 52 and reach the gaseous fuel injector 54. The fluid control valve 70 may close at a point 119 to cut off the flow of gaseous fuel to the gaseous fuel injector 54 slightly before (i.e., about 1-3° of crank angle rotation before) the gaseous fuel injection ends at a point 118 when the air intake ports 32 close. Accordingly, a region 121 represents the period of time corresponding to the fluid control valve 70 being in an open position.

As the piston 24 moves upwardly from BDC 104, the piston crown 26 will gradually close the air intake ports 32. The air intake ports 32 may be completely closed at the point 118. All gaseous fuel injection may occur before this point is reached.

In some embodiments, the positive pressure subsystem 82 of the purge system 80 may release a purge fluid from the purge fluid supply 86 into the purge fluid supply line 91 to force residual gaseous fuel in the fuel line 52 and/or in the gaseous fuel injector 38 into the combustion chamber 22 before the air intake ports 32 are completely closed at the point 118. To that end, the admittance valve 90 may be opened at a point 131 to enable purge fluid to flow into the purge fluid supply line 91 and force the residual gaseous fuel remaining in the fuel line 52 and/or the gaseous fuel injector 38 into the combustion chamber 22. In some embodiments, the admittance valve 90 may be opened about 1-5° of crank angle rotation before gaseous fluid injection ends at the point 118 when the air intake ports 32 close. The point 131 may be located at about 231° (e.g., 231°±5°) of crank angle rotation after TDC. The admittance valve 90 may remain open until the point 118 when the admittance valve 90 closes, the air intake ports 32 close, and the gaseous fuel injection ends, thus defining a region 124 corresponding to a purge event during which the residual gaseous fuel is forced into the combustion chamber 22. However, in other embodiments, the admittance valve 90 may close about 1-3° of crank angle rotation after the point 118 to continue the purge slightly after the air intake ports 32 close. Further, in some embodiments, the purge may be controlled by the electronic controller 55 to occur during every engine cycle each time the air intake ports 32 are opened and closed.

In some embodiments, the activation of the negative pressure subsystem 84 may be coordinated with the activation of the positive pressure subsystem 82. For example, the return valve 96 may be actuated at the point 118 when the air intake ports 32 and the admittance valve 90 close to enable the residual gaseous fuel that was not forced into the combustion chamber 22 during the purge region 124 to flow through the return valve 96 into the accumulator 94. The return valve 96 may remain open until point 126 to ensure recapture of the residual gaseous fuel and/or any remaining purge fluid. As such, a region 128 corresponds to a vacuum period during which the residual gaseous fuel is sucked back into the accumulator 94. The vacuum region 128 may extend about 10° (e.g., 10°±3°) of crank angle rotation after the air intake ports 32 close at the point 118. Thus, in the illustrated embodiment, the purge region 124 and the vacuum region 128 do not overlap.

However, in other embodiments, the purge region 124 and the vacuum region 128 may overlap. For example, in one embodiment, the purge region 124 may extend to a point 122 about 1-2° of crank angle rotation after point 118, at which the air intake ports 32 close and the vacuum region 128 begins. In this embodiment, the time period between point 118, when the return valve 96 opens, and the point 122 when the admittance valve 90 closes, represents an overlap of about 1-2° of crank angle rotation when the return valve 96 and the admittance valve 90 are both open such that the residual gaseous fuel is being both pushed and sucked into the accumulator 94.

In another embodiment, the negative pressure subsystem 84 may be activated independent of the positive pressure subsystem 82. For example, the negative pressure subsystem 84 may be activated by the electronic controller 55 about 1-2° of crank angle rotation before point 118 when the air intake ports 32 close to apply a negative pressure to the fuel line 52 and/or the gaseous fuel injector 38 to suck the residual gaseous fuel present in the fuel line 52 and/or the gaseous fuel injector 38 after the gaseous fluid control valve 70 closes through the return line 92 and the return valve 96 into the accumulator 94. By doing so, the residual gaseous fuel may be recaptured, thus reducing the likelihood that the residual gaseous fuel will contaminate the air box 40, become exhaust in the combustion chamber 22 during the next cycle, or otherwise be wasted.

The beginning point 131 of the purge represented by the region 124 may be subject to a variety of implementation-specific variations. For example, in other embodiments, the purge region 124 may extend throughout the region 111 extending from point 112 when the air intake ports 32 open until when the air intake ports 32 close such that the operation of the positive pressure subsystem 82 is continuously on throughout the cycle. In these embodiments, the actuation of the return valve 96 may be controlled such that the return valve 96 is in an open position when the air intake ports 32 are closed at point 118 and in a closed position during the region 111 when the air intake ports 32 are open. In this way, the purge fluid and the residual gaseous fuel will be either injected into the combustion chamber 22 or recovered into the accumulator 94 throughout the cycle, thus ensuring that residual gaseous fuel is not leaked into the air box 40 or otherwise wasted.

Further, in some embodiments, the negative pressure subsystem 84 may be continuously on throughout the cycle. In other embodiments, the negative pressure subsystem 84 may be continuously on, but the operation of the return valve 96 may be metered such that the negative pressure subsystem 84 vacuums varying amounts of fluid at various times throughout the cycle. Additionally, in continuously on embodiments, the vacuumed fluid may be recycled via the accumulator 94 back to the gaseous fuel injector 38.

Additionally, in some embodiments, the length of time that the admittance valve 90 remains open may correspond to the volume capacity of the gaseous fuel injector 38 and/or the volume capacity of the fuel line 52. For example, the admittance valve 90 may be controlled such that an amount of purge fluid substantially equal to or slightly greater than the volume capacity of the gaseous fuel injector 38 and/or the fuel line 52 is allowed to pass through the admittance valve 90 each time the air intake ports close at point 118, or slightly before (e.g., about 5-10° of crank angle rotation before) the air intake ports 32 close at point 118. However, in other embodiments, the admittance valve 90 may be configured to enable a certain multiple (e.g., 2 times) of the volume capacity of the gaseous fuel injector 38 and/or the fuel line 52 to pass therethrough before being closed.

It is contemplated that in some embodiments, the gaseous fuel will be injected during about 25% to 40% of the full time period between points 12 and 118, in which air intake ports 32 are open. In one embodiment, this injection time may occur only during the second half of this time period, when the piston 24 is in its intake/compression stroke. After gaseous fuel is injected and the intake ports 32 are closed, the exhaust ports 34 may close near a point 120, which maybe about 248° (e.g., 248°±5°) of crank angle rotation after TDC, thus defining a region 130 corresponding to the period of time during which the exhaust ports 34 are open. Before reaching TDC 102, liquid fuel injection may start at point 106. As piston 24 finishes its intake/compression stroke, the injected liquid fuel may cause combustion of the overall fuel mixture, thereby restarting the cycle.

One or more advantages may be realized by using the purge system 80. For example, by purging the residual gaseous fuel from the fuel line 52 and/or the gaseous fuel injector 38, the residual gaseous fuel may be partially or fully prevented from leaking into the air box 40, thus reducing or preventing the likelihood that the methane quantity in the air box 40 is above a desired level. Further, use of the purge system 80 may reduce or prevent the likelihood that a low-pressure zone created proximate a nozzle of the gaseous fuel injector 38, when the air intake port 32 is open, will draw methane (which does not participate in the combustion) into the combustion zone 22 and lead to increased exhaust. Additionally, by recapturing and recycling, or otherwise making use of the residual gaseous fuel, the efficiency of the overall system may be improved.

Unless otherwise indicated, the terms "about" and "approximately" mean that the values being modified are intended to encompass both the value stated as well as normal manufacturing tolerances around the stated value.

It will be apparent to those skilled in the art that various modifications and variations can be made to the purge system. Other embodiments will be apparent to those skilled in the art from consideration of the specification and practice of the disclosed purge system. It is intended that the specification and examples be considered as exemplary only, with a true scope being indicated by the following claims and their equivalents.

What is claimed is:

1. A fuel system for an engine having a cylinder with an inlet air port, the fuel system comprising:
    an air box surrounding the inlet air port;
    a gaseous fuel injector positioned in the air box and having a nozzle located at the inlet air port;
    a gaseous fuel control valve;
    a fuel supply line fluidly extending from the gaseous fuel control valve to the gaseous fuel injector;
    a purge valve fluidly coupled to a purge fluid supply;
    a purge fluid supply line fluidly extending from the purge valve to at least one of the fuel supply line and the gaseous fuel injector;
    a return valve fluidly coupled to an accumulator; and
    a return line fluidly extending from at least one of the fuel supply line and the gaseous fuel injector to the return valve.

2. The fuel system of claim 1, wherein the purge valve is an admittance valve enabling the purge fluid to flow from the supply of purge fluid into the at least one of the fuel supply line and the gaseous fuel injector.

3. The fuel system of claim 1, further including a regulator coupled to the return valve.

4. The fuel system of claim 1, further including a controller that opens the purge valve at about 1-5° of crank angle rotation before closing the gaseous fuel control valve.

5. The fuel system of claim 1, further including a controller that keeps the return valve open throughout an engine cycle.

6. The fuel system of claim 1, further including a controller that closes the purge valve at about 1-3° of crank angle rotation after the inlet air port closes.

7. The fuel system of claim 1, further including a controller that closes the purge valve at about 1-3° of crank angle rotation after opening the return valve.

8. The fuel system of claim 1, further including a controller that causes the return valve to remain at least partially open throughout an engine cycle.

9. The fuel system of claim 1, further including a controller that opens the purge valve at about 231° of crank angle rotation after top dead center.

10. A method of directing gaseous fuel into an engine having a cylinder with an inlet air port, the method comprising:
    supplying gaseous fuel from a gaseous fuel storage tank through a gaseous fuel control valve to a fuel supply line;
    controlling a gaseous fuel injector to inject the gaseous fuel from the fuel supply line through the inlet air port into the cylinder;
    supplying a purge fluid from a purge fluid supply through a purge valve and a purge fluid supply line to displace residual gaseous fuel in at least one of the supply line and the gaseous fuel injector at a conclusion of an injection event; and
    maintaining a negative pressure differential between at least one of the fuel supply line and the gaseous fuel injector and a return line to draw the residual gaseous fuel through the return line and a return valve to an accumulator.

11. The method of claim 10, wherein supplying the purge fluid includes supplying the purge fluid at about 1-5° of crank angle rotation before controlling the gaseous fluid injector to stop injecting the gaseous fuel.

12. The method of claim 10, further including controlling the purge valve to close about 1-3° of crank angle rotation after the inlet air port closes.

13. The method of claim 12, further including controlling the return valve to open at about the same time that the inlet air port closes.

14. The method of claim 10, further including accumulating residual gaseous fuel vacuumed through the return valve.

15. The method of claim 14, further including supplying the accumulated residual gaseous fuel from an accumulator to the fuel supply line.

16. The method of claim 10, wherein supplying the purge fluid includes supplying a volume of the purge fluid approximately equal to a volume of the supply line.

17. The method of claim 10, wherein supplying the purge fluid includes supplying a volume of the purge fluid approximately equal to a volume of the gaseous fuel injector.

18. The method of claim 10, further including controlling the purge valve to close at about the same time that the inlet air port closes.

19. The method of claim 9, further including controlling the purge valve to close at about 1-3° of crank angle rotation after causing the return valve to open.

20. A fuel system, comprising:
    an engine block defining a plurality of cylinders;
    an air box connected to a side of the engine block;
    a cylinder liner disposed in each of the plurality of cylinders and having a plurality of radially located air intake ports;
    a gaseous fuel injector positioned in the air box and having a nozzle located at a first air intake port of the plurality of air intake ports and configured to inject gaseous fuel radially through the first air intake port;

a gaseous fluid control valve fluidly coupled to the gaseous fuel injector;
a supply line fluidly extending from the gaseous fluid control valve to the gaseous fluid injector;
a purge valve fluidly coupled to a purge fluid supply;
a purge fluid supply line fluidly extending from the purge valve to the supply line, the gaseous fluid injector, or both;
a return valve fluidly coupled to an accumulator; and
a return line fluidly extending from the supply line, the gaseous fluid injector, or both to the return valve.

* * * * *